Sept. 8, 1964  D. L. AMSDEN  3,147,515
APPARATUS FOR EXTRUDING TUBING
Filed April 7, 1961  2 Sheets-Sheet 2
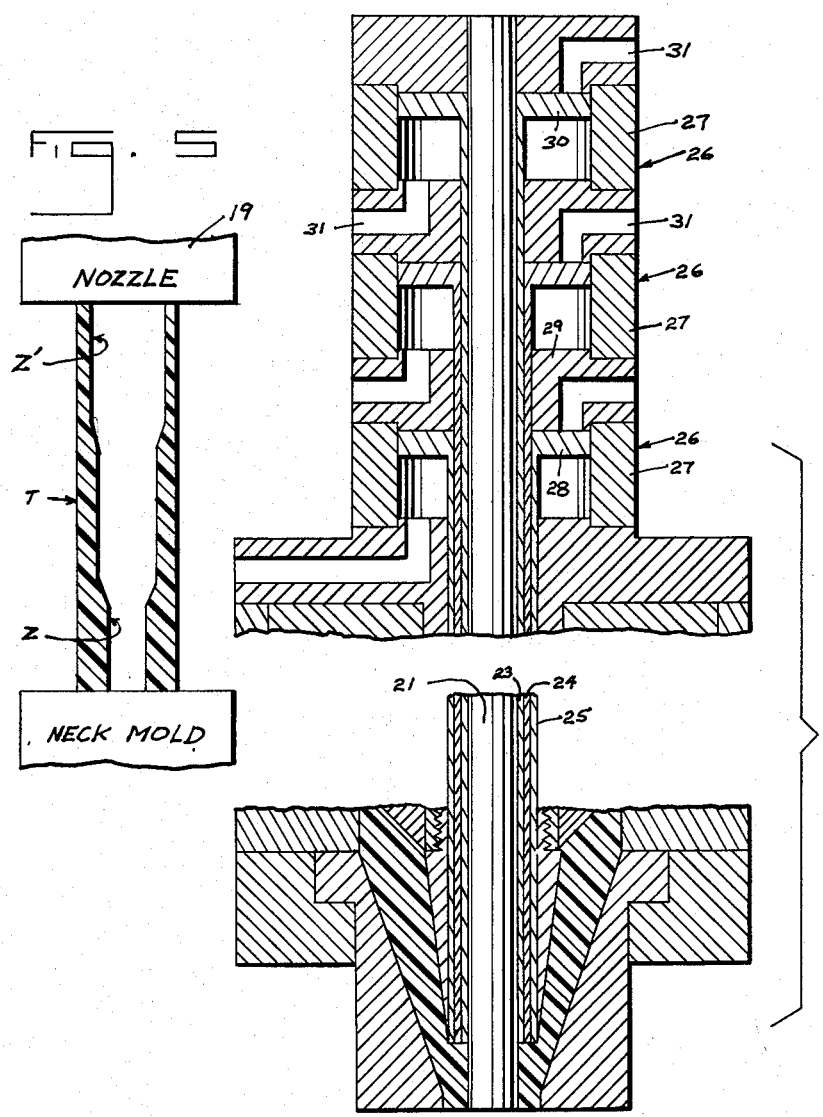
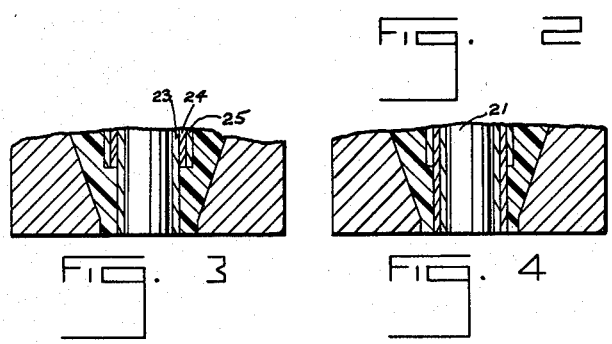
INVENTOR.
DONALD L. AMSDEN
BY  C. S. LYNCH &
W. A. SCHAICH
ATTORNEYS

United States Patent Office 3,147,515
Patented Sept. 8, 1964

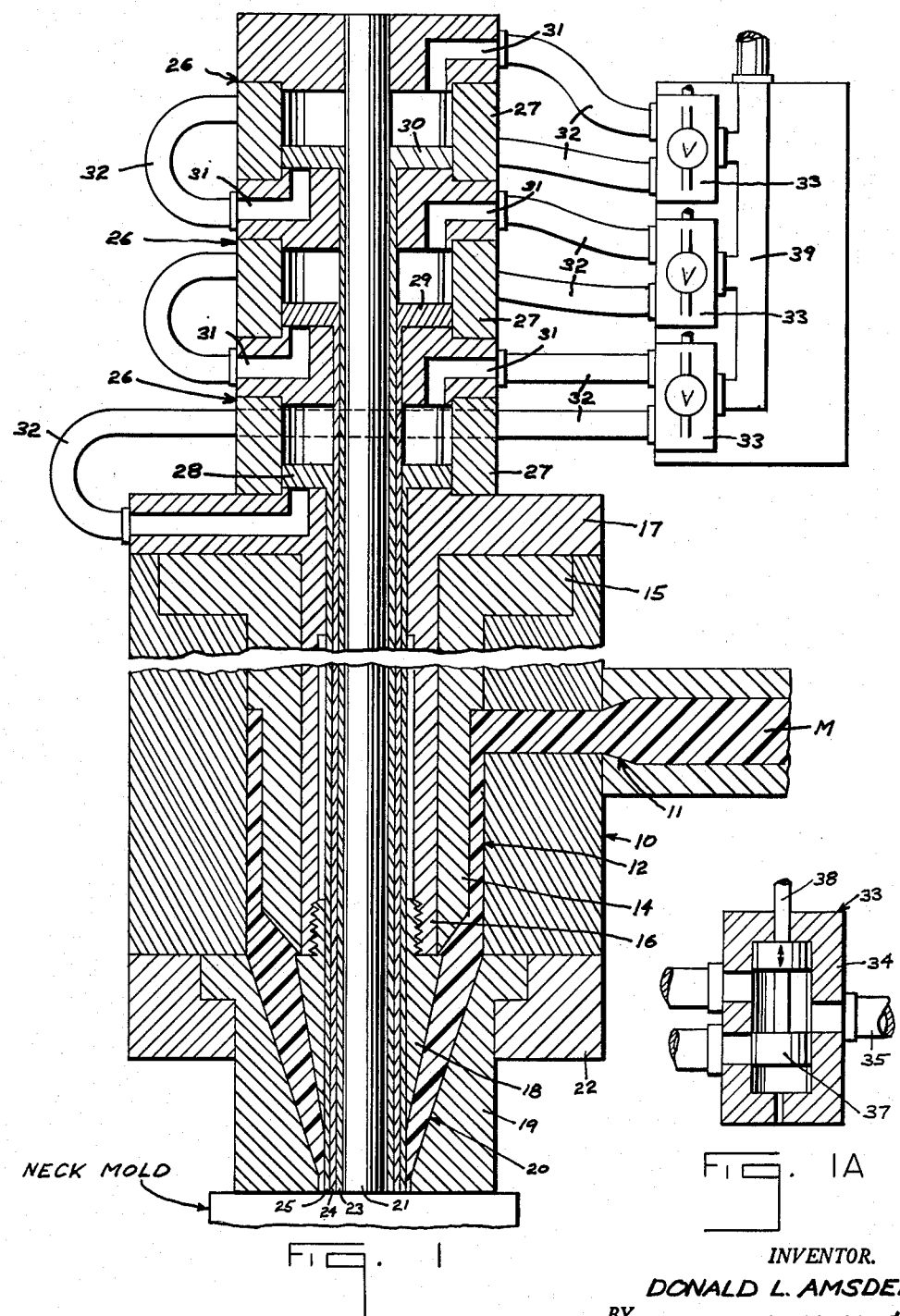

3,147,515
APPARATUS FOR EXTRUDING TUBING
Donald L. Amsden, Toledo, Ohio, assignor to Owens-Illinois Glass Company, a corporation of Ohio
Filed Apr. 7, 1961, Ser. No. 101,542
1 Claim. (Cl. 18—14)

My invention is a novel apparatus for producing tubing of a thermoplastic material, such as polyethylene, from which bottles are formed.

According to one known conventional procedure, plastic bottles are fabricated by injecting a quantity of polyethylene into a neck mold cavity, then as a result of moving the neck mold away from the source of supply of molding material, coupled with an extrusion step, forming a hollow tube. This tube is pinched-off from the supply device and sealed preparatory to being expanded to produce a finished bottle or the like container conforming in contour and dimensions to the mold cavity. Such tubes are generally straight-sided and of substantially uniform thickness from end to end.

It has been my observation that all too frequently, bottles fabricated from such tubing have dangerously thin shoulder portions and quite often, needlessly heavy, thick bottoms. The thin shoulders result in a weak container liable to burst in handling, shipment, etc. The needlessly thick or heavy bottom means simply a waste of molding material and consequent unwarranted increase in production costs.

An object of my invention is the provision of a novel apparatus through the utilization of which the above indicated deficiencies may be overcome.

Another object of my invention is the provision of a novel and efficient apparatus whereby each extruded length of tubing will vary in wall thickness in preselected axially spaced apart annular zones, and in such fashion or pattern as to insure production of bottles or the like containers which are free from the above described defects.

It is also an object of my invention to provide a novel tube interior defining mandrel, designed for cooperation with a bushing to vary the wall thickness of extruded tubing in a predetermined but regulable pattern.

A further object of my invention is the provision of a mandrel formed of a plurality of telescoped sleeves which are adjustable axially and individually relative to a bushing to the end that the radial dimension between the mandrel and bushing may be varied at will and as dictated by needed changes in tube wall thickness.

Finally, it is an important object of my invention to provide a mandrel composed of a plurality of telescoped sleeves and to adjust these sleeves individually or as a unit in timed relation to tube extrusion whereby to insure wall thickness variations in preselected zones.

Other objects will be in part apparent and in part pointed out hereinafter.

In the accompanying drawings forming a part of my application:

FIG. 1 is a vertical longitudinal sectional view of a tube forming nozzle embodying my invention, with parts in elevation.

FIG. 1-A is a detail sectional view partially in elevation showing one form of control valve.

FIG. 2 is a fragmentary sectional view of my invention, showing the sleeves positioned to form a tube of maximum wall thickness.

FIG. 3 is a detail sectional view of the mandrel set to produce another tube wall thickness.

FIG. 4 is a detail sectional view of the mandrel with the sleeves positioned to produce an intermediate wall thickness.

FIG. 5 is a fragmentary sectional elevational view showing an extruded length of tube anchored to a nozzle and a neck mold and indicating varied wall thickness in selected zones of the tube.

In the illustrated form of the apparatus embodying my invention, it comprises a cylinder-like orifice head 10 provided with an inlet 11 at one side, through which plasticized molding material M is introduced into an annular longitudinal channel 12 which lies between a wall forming an axial bore through said head and a coaxial tube 14, the latter having at its upper end a radial supporting flange 15 extending outwardly and resting upon the upper end of the orifice head 10. A tubular fixed mandrel holder 16 is fitted within the tube 14, such holder having a radial flange 17 at its upper end overlying and resting upon the flange 15 of said tube 14 and at its lower end being threaded onto a fixed downwardly tapered mandrel 18. This tapered mandrel is coaxial within a bushing 19, the latter having a tapered bore 20, which, together with the mandrel 18, forms a downwardly tapering annular channel or orifice terminating short of the bottom end of the bushing 19. A holder 22 supports the bushing 19 against the bottom end of the orifice head 10. The foregoing is more or less conventional structure.

In FIG. 5 I have illustrated a typical tube section T produced by my apparatus, the wall thickness varying in axially spaced apart zones. The tube generally is of uniform wall thickness but in a zone Z immediately adjacent the neck mold is of increased thickness. Thus, with expansion of the tube to produce a shouldered bottle, the additional material in the zone Z will be incorporated in the shoulder section of the finished container. As a consequence, this section, instead of being thinned out by stretching of the plastic material, will be of about the same thickness as the remainder of the bottle. The zone Z' of reduced thickness, near the nozzle, is that which forms the bottom of the bottle. Ordinarily the bottom is excessively thick. By merely reducing the tube wall thickness in zone Z', the resultant bottom thickness and bulk are decreased, as desired.

The specific mechanism for producing the successive lengths T of tubing, blanks, or preforms, may well comprise a plurality of telescoped movable mandrel sleeves, including in the illustrated embodiment, an inner sleeve 23, an intermediate sleeve 24 and an outer sleeve 25. These sleeves (FIG. 1) are disposed coaxially in part within the fixed mandrel holder 16 and the tapered mandrel 18 but extend above the orifice head where they are connected to means for moving them axially individually or as a unit, as will be apparent presently.

These sleeves may, as shown in FIG. 2, have their bottom ends coextensive with the lower end of the fixed mandrel 18 or relatively positioned as illustrated in any of FIGS. 1, 3 and 4. To produce the wall thickness variation as indicated in FIG. 5, the sleeves may be set in the positions of FIG. 3 so that a length of extruded tubing will incorporate the thickened zone Z. The moment this zone Z has been extruded, the intermediate sleeve 24 may be lowered as in FIG. 4. Thus the wall thickness of the extruded tube will promptly be reduced. As the neck mold lowers away from the nozzle or bushing 19 and approaches its limit of downward travel, the tube wall thickness is reduced by lowering the outer sleeve 25, as in FIG. 1. These sleeves, of course, must be and are moved axially to the desired operating positions, in timed relation to the rate of tube extrusion, as is obvious. A center rod 21 extending through the sleeves has its bottom end so positioned that at times it functions as a mandrel.

The sleeve actuating mechanism may well comprise a plurality of air operated piston motors 26, one for each sleeve. These motors 26 are stacked one upon another with their cylinders 27 positioned coaxially. In the arrangement illustrated, the lowermost motor has a piston 28 connected to the upper end of the outer sleeve 25. The intermediate motor cylinder 27 houses a piston 29 supporting the intermediate sleeve 24 and the upper motor cylinder houses a piston 30 from which the inner sleeve 23 is suspended. Ports 31 are provided in each cylinder 27 and are connected to air pressure supply lines 32 which lead to control valves 33. The control valves are individual to the motors and although other types may well be utilized, I have shown a spool-type valve of conventional form. This valve (FIG. 1–A) comprises a housing 34 of cylindrical form having an inlet pipe 35 for air under pressure connected to it medially of its length and a pair of said pipes 32 leading to one of the motor cylinders. An axially shiftable spool 37 is mounted in the housing 34, having at one end a connecting rod 38 which may be secured to any preferred form of actuator (not shown), a solenoid device, for example. A main air pressure supply line 39, or header, is connected to the inlet pipes 35. A shut-off valve (not shown) may be placed in the supply line 39. Any preferred form of timer (not shown) may be employed in effecting the desired sequential operation of the mandrel sleeve moving motors, to the end that they occupy the desired positions at different stages of each tube extruding cycle.

Modifications may be resorted to within the spirit and scope of the appended claim.

I claim:

A thermoplastic extrusion device comprising an extrusion head having a passage adapted for flow of heated thermoplastic material therethrough, said passage terminating in an outlet determining the outer periphery of thermoplastic material extruded therethrough, a mandrel disposed in said passage cooperating with said outlet to define an extrusion orifice through which said thermoplastic material issues in the form of tubing, said mandrel comprising a core member having longitudinal wall elements, the longitudinal wall elements of said core member being parallel to the longitudinal axis thereof, a plurality of sleeves surrounding said core member, the innermost sleeve maintained in slidable relation to said core member, and all sleeves maintained in slidable relation to adjacent sleeves, both internal and external longitudinal wall elements of said sleeves being parallel to said longitudinal axis, two or more of said sleeves sized to be received within said outlet and maintained in spaced annular relation with the wall thereof, and means for individually moving said sized sleeves longitudinally into and out of alignment with said outlet to thereby vary the size of said orifice.

References Cited in the file of this patent

UNITED STATES PATENTS

| | | |
|---|---|---|
| 2,632,202 | Haines | Mar. 24, 1953 |
| 2,633,602 | Sverdrup | Apr. 7, 1953 |
| 2,706,308 | Lorenz | Apr. 19, 1955 |
| 2,710,987 | Sherman | June 21, 1955 |
| 2,750,625 | Colombo | June 19, 1956 |
| 2,780,835 | Sherman | Feb. 12, 1957 |
| 2,878,520 | Mumford et al. | Mar. 24, 1959 |
| 2,899,709 | Steiner | Aug. 18, 1959 |
| 2,935,764 | Mason | May 10, 1960 |
| 3,019,481 | Negoro | Feb. 6, 1962 |
| 3,023,461 | Sherman | Mar. 6, 1962 |
| 3,078,507 | Park | Feb. 26, 1963 |

FOREIGN PATENTS

| | | |
|---|---|---|
| 1,025,834 | France | Jan. 28, 1953 |